P. ROUSSEY.
AUTOMOBILE INDICATOR.
APPLICATION FILED AUG. 7, 1915.
1,191,830.
Patented July 18, 1916.
2 SHEETS—SHEET 1.
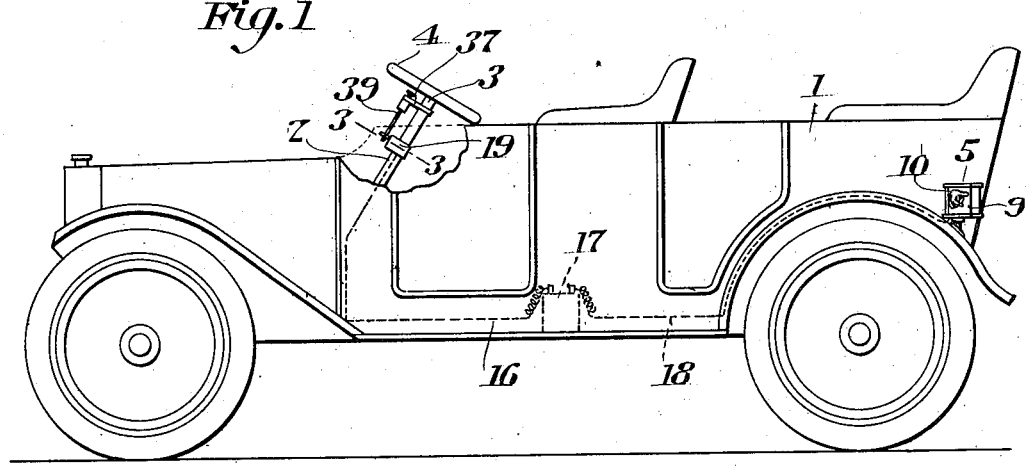
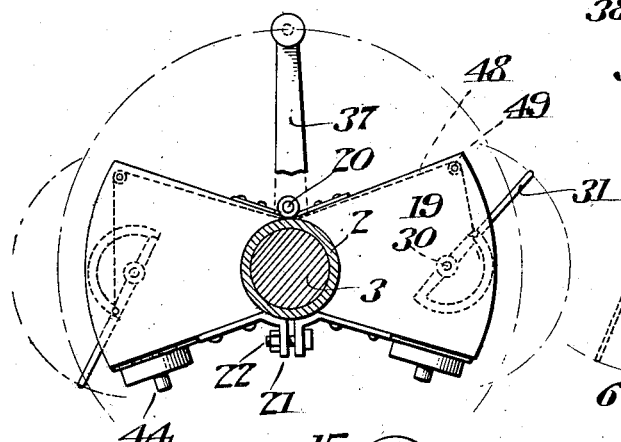
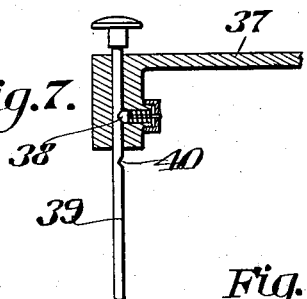
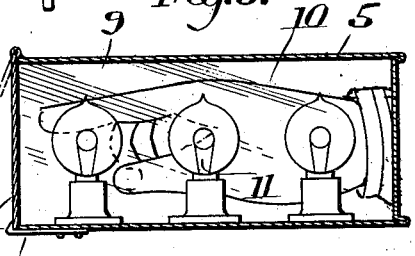
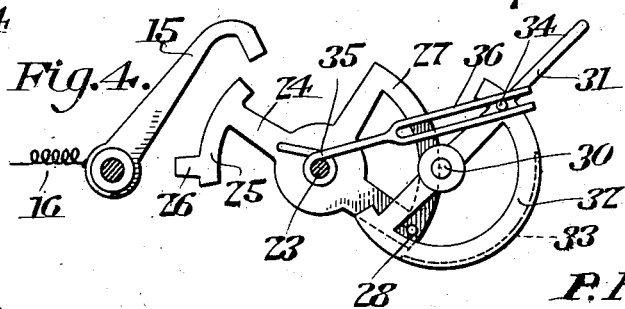
Witnesses
M. E. Laughlin
A. F. Stevens
Inventor
P. Roussey,
By Victor J. Evans
Attorney P. ROUSSEY.
AUTOMOBILE INDICATOR.
APPLICATION FILED AUG. 7, 1915.
1,191,830.
Patented July 18, 1916.
2 SHEETS—SHEET 2.
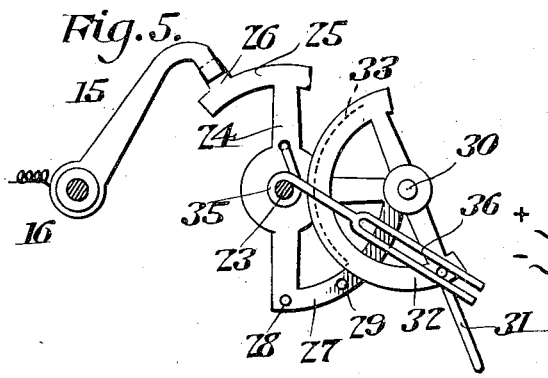
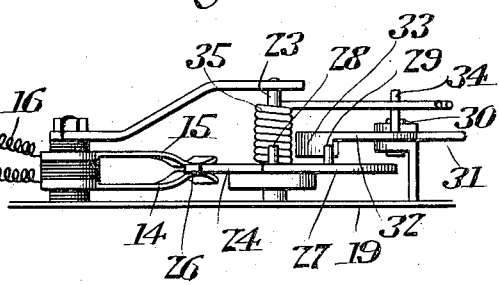
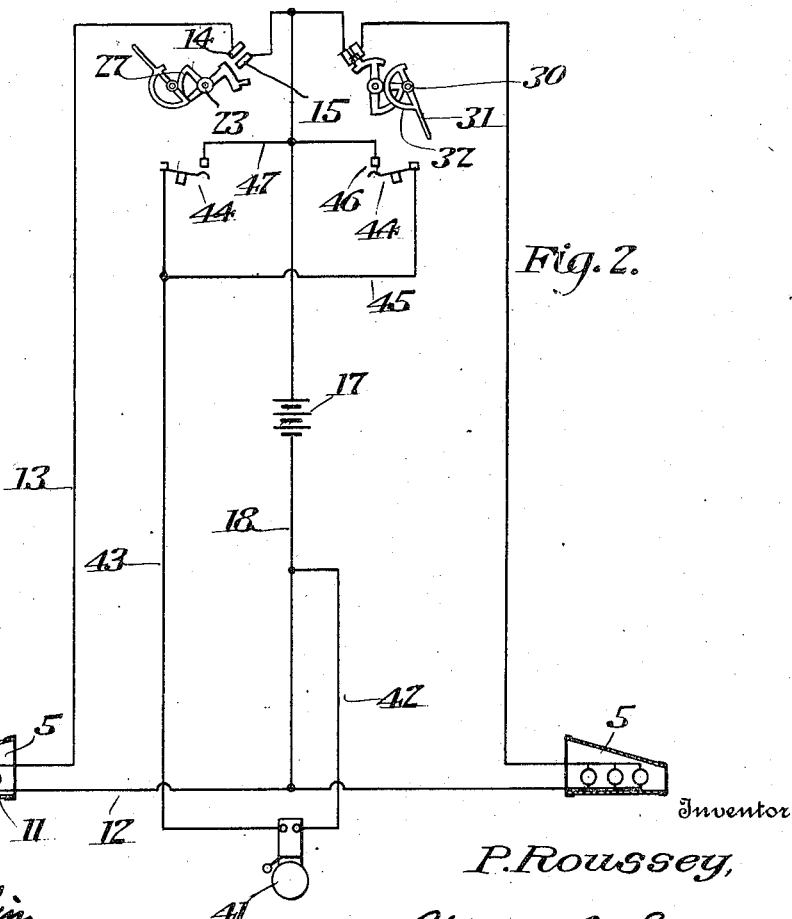
Inventor
P. Roussey,
By Victor J. Evans
Attorney
Witnesses

UNITED STATES PATENT OFFICE.

PAUL ROUSSEY, OF BROOKLYN, NEW YORK, ASSIGNOR OF ONE-HALF TO JOHN D. BOOKS, OF BROOKLYN, NEW YORK.

AUTOMOBILE-INDICATOR.

1,191,830.　　　　Specification of Letters Patent.　　Patented July 18, 1916.

Application filed August 7, 1915. Serial No. 44,229.

*To all whom it may concern:*

Be it known that I, PAUL ROUSSEY, a citizen of France, residing at Brooklyn, in the county of Kings and State of New York, have invented new and useful Improvements in Automobile-Indicators, of which the following is a specification.

This invention relates to direction indicators for automobiles and similar vehicles and it consists in the novel features hereinafter described and claimed.

An object of the invention is to provide an indicator of simple structural arrangement adapted to be operated electrically for indicating the direction in which an automobile is about to be turned or steered when directed by a steering apparatus for changing its course of travel.

With the above object in view the indicator includes lamp bodies adapted to be positioned at the rear portion of the body of the machine and preferably beyond the sides thereof, said lamp bodies being provided with suitable bulbs electrically connected with a battery or other suitable source of electric supply, and spaced terminals. A pin is movably mounted upon the shaft of the steering wheel and mechanism is provided upon or in the vicinity of the steering post with which the said pin may contact as the steering wheel is turned. When the pin comes in contact with the said mechanism it is operated to close the circuit to the bulbs in one or the other of the said lamp bodies, whereby the said bulbs are illuminated at one side of the body of the machine. When the bulbs at one side of the machine are illuminated it indicates the direction in which the machine is about to be turned or steered, consequently a person who is traveling in a machine following that provided with the said indicator is notified in which direction the preceding machine is to turn, and consequently the possibility of accident is materially reduced.

The lamp bodies are provided at their forward sides with transparencies through which the bulbs, when illuminated, can be readily observed from the front of the machine. Therefore when machines are approaching each other from opposite directions, the signal may be operated to indicate the direction in which the said machines are about to turn and thus the possibility of accident is reduced.

In the accompanying drawings: Figure 1 is a side elevation of an automobile with the indicator applied. Fig. 2 is a diagrammatic view of the indicator. Fig. 3 is a transverse sectional view of part of the indicator mechanism cut on the line 3—3 of Fig. 1. Fig. 4 is a detail plan view of the circuit closer of the indicator showing parts in one position. Fig. 5 is a similar view showing the parts in another position. Fig. 6 is an edge view of said circuit closer. Fig. 7 is a detail view of a pin which is movably mounted upon the steering wheel shaft. Fig. 8 is a longitudinal sectional view of one of the lamp bodies.

As illustrated in the accompanying drawings the automobile body 1 may be of conventional type and is provided with a steering standard 2 in which is turnably mounted a steering shaft 3. A steering wheel 4 is mounted at the upper end of the shaft 3 in the usual manner.

Lamps are arranged at the rear portion of the body 1, preferably at the sides thereof, and inasmuch as the said lamps are of the same structural arrangement a description of one will answer for both. Each lamp includes a body 5 having at its outer end a hinged door 6 adapted to be held in a closed position with relation to the body 5 by means of a spring catch 7. The body 5 is provided at its front and rear sides with transparencies 8 and 9 which may be of glass or other suitable material. These transparencies, if desired, may be provided with indicator hands 10 which are painted or otherwise applied to the said transparencies, and which are of a translucent nature. Bulbs 11 are mounted in the lamp bodies 5 and a wire 12 electrically connects the sockets of the bulbs 11 in the lamp body at the opposite sides of the vehicle together. Wires 13 connect the sockets of the bulbs 11 with terminals 14. Terminals 15 are arranged opposite the terminals 14 and spaced therefrom. A wire 16 electrically connects the terminals 15 with a battery 17 and a wire 18 electrically connects the said battery with the wire 12.

Casing halves 19 are hingedly connected together as at 20, and the said halves are provided at their opposite sides with lugs 21 through which a traction bolt 22 passes. The bolt 22 when applied to the lugs 21 and tightened, is adapted to clamp the halves 19 around the steering standard 2, as best shown in Fig. 3 of the drawings. The terminals 14 and 15 are located in the casing halves 19. The battery 17 may be located at any convenient point in the body 1 of the vehicle. Studs 23 are mounted in the casing halves 19 and arms 24 are turnably mounted upon the said studs. The arms 24 are provided at their outer ends with segments 25 and the said segments are provided with out-standing lugs 26, adapted at times to enter between the terminals 14 and 15 and have contact with both of the said terminals. The arms 24 are provided at their inner ends with fixed sectors 27, upon which are mounted spaced pins 28 and 29.

Studs 30 are mounted in the casing halves 19 and levers 31 are fulcrumed upon the said studs 30. The free end portions of the levers 1 project beyond the outer sides of the casing halves 19 as best shown in Fig. 3 of the drawings. The levers 31 are provided with arcuate sections 32 positioned concentrically with relation to the fulcrum points of the said levers, and the said sections 32 are provided at their under sides with depending flanges 33, which project below the upper ends of the pins 28 and 29, and which at times are adapted to be encountered by the said pins as hereinafter described. Upstanding pins 34 are mounted upon the levers 31 at points between the free ends of the said levers and the fulcrum points thereof. Springs 35 are coiled about the studs 23 and are secured at one end to the arm 24 and the said springs are provided at their other ends with forks 36 which receive the pins 34 between opposite sides.

An arm 37 is fixed to the steering shaft 3 at a point above the upper end of the standard 2 and a spring pressed pawl 38 is movably mounted in the outer end portion of the said arm. A pin 39 is movably mounted in the outer portion of the arm 37 and is provided at its side with detents 40 adapted to be engaged by the spring pressed pawl 38, as best shown in Fig. 7 of the drawings.

A bell or other audible signal 41 is mounted at the rear end of the body 1 and a wire 42 connects the said bell with the wire 18 as shown in Fig. 2. A wire 43 connects the bell 41 with a movable switch 44 located upon one of the casing halves 19 and a wire 45 connects the wire 43 with a similar switch located upon the other casing half 19. Terminals 46 are located adjacent the free ends of the switches 44 and a wire 47 electrically connects the said terminals together and with the wire 16 as shown in Fig. 2.

As indicated in dotted lines in Fig. 3 of the drawings a flexible element 48 is connected at one end with one of the levers 31 and at its other end with the other lever 33, and the intermediate portion of the said flexible element 48 is trained around pulleys 49 journaled in the casing halves 19. The direction indicator is intended to be used at night, and when used, the pin 39 is pushed down through the arm 37 so that the pawl 38 engages in the uppermost detent 40 of the said pin. When the pin is so positioned the levers 31 lie in the path of movement of the pin 39 as the steering wheel 4 is turned. Assuming that the operator of the automobile is about to turn to the right, the steering wheel 4 is turned accordingly and the lower end portion of the pin 39 encounters the lever 31 at the right casing half 19 as indicated by the dotted line in Fig. 3. The lever 31 is swung to the right from the position shown in Fig. 4 to the position shown in Fig. 5. During the initial movement of the lever 31 from the position shown in Fig. 4, the pin 34 carried by the lever 31 operates in conjunction with the fork 36 at the upper end of the spring and turns the said spring about the stud 23 whereby the pin 28 is brought in contact with the flange 33 depending from the section 32. The said flange holds the arm 24 and the sector 27 thereof against further movement until the end of the flange 33 passes beyond the pin 28. In the meantime, the spring 35 has been tensioned and as soon as the pin 28 passes beyond the end of the flange 33, the said spring acts upon the arm 24 whereby the arm is swung and the lug 26 is carried rapidly in between and in contact with the terminals 14 and 15 as best indicated in Fig. 6 of the drawings. The lever 31 now assumes the position shown in Fig. 2 of the drawings and an electric circuit is established from the battery 17 along the wire 16 through the contacts 14 and 15 and wire 13 to the bulbs in the lamp body 5 at the right hand side of the vehicle. Thus the said bulbs are illuminated and current passes from the bulbs along the wire 12 and thence along the wire 18 back to the battery 17. If, after the bulbs have just been illuminated as above described it is desired to sound the bell 41, the operator pushes either one of the switches 44 into contact with its coöperating terminal 46, whereby electric current is established from the battery 17 along wire 16, thence along wire 47 to the terminal 46, thence to the switch 44 and along the wire 45 to the wire 43, thence to the bell 41, thence along 42 to wire 18 and back to the battery 17. Assuming now that the operator of the vehicle intends to turn the same to the left, the steering wheel 4 is turned accordingly and the pin 19 is brought in contact with the lever 31 at the left casing half 19. The said lever 31 is then swung in a rearward direction to the position indicated by heavy lines in Fig. 3, and the flexible element 48 moves longitudinally whereby the lever 31 at the right hand casing half 19 is brought to its forward position as shown in the said figure. During the forward movement of either one of the levers 31 the pin 29 first has contact with the flange 33 at the under side of the section 32, and when the end of the said flange passes beyond the said pin the arm 24 under the tension of the spring 35 is turned whereby its lug 26 is carried from between the contacts 14 and 15 and the bulbs at one side of the vehicle body are extinguished while the bulbs at the other side are illuminated.

During the daytime when an arm signal may be used for indicating the course in which a vehicle is to be steered, the pin 39 may be adjusted in the arm 37 so that the pawl 38 engages in the lowermost detent 40, whereby the lower end of the pin 39 is held above the planes in which the free ends of the levers 31 lie, consequently the wheel 4 may be turned in either direction without swinging the levers 31.

The transparencies 8 in the lamp bodies 5 are positioned approximately parallel with the rear side of the body 1 while the transparencies 9 of the said lamp bodies are positioned at an angle to the rear side of the body 1. Through the transparencies 9 persons occupying vehicles approaching from the front may observe the light from the bulbs 11 and through the transparencies 8 persons who are following in vehicles behind may observe the light from the said bulbs.

Having described the invention what is claimed is:—

1. An indicator comprising spaced terminals, a lever pivotally mounted and having a section provided with an arcuate flange, an arm turnably mounted and having a lug adapted to engage the terminals, spring means operatively connecting the arm with the lever and a pin carried by the arm and engageable with the flange, said flange adapted to pass beyond the path of movement of the pin.

2. In an indicator spaced terminals, a lever pivotally mounted, a pin carried by the lever, an arm turnably mounted and having a lug adapted to engage the terminals, and a spring connected with the arm and having a fork which receives the pin.

3. In an indicator spaced terminals, a lever mounted upon a fulcrum point, an arm turnably mounted and having a lug adapted to engage the terminals and a spring operatively connecting the arm with the lever.

4. In an indicator spaced terminals, a fulcrumed lever, an arcuate flange carried by the lever, an arm turnably mounted and having a lug adapted to engage the terminals, pins carried by the arm and engageable with the flange and a spring operatively connecting the arm with the lever.

5. In an indicator spaced terminals, a lever mounted upon a fulcrum, means for swinging the lever, an arcuate flange carried by the lever, a pin mounted upon the lever, an arm turnably mounted and having a lug adapted to engage the terminals, spaced pins carried by the arm and adapted to engage the flange of the lever, a spring coiled about the support of the arm and connected at one end with the arm and having at its other end a fork which receives the pin upon the lever.

In testimony whereof I affix my signature in presence of two witnesses.

PAUL ROUSSEY.

Witnesses:
W. E. LAUGHLIN,
GEO. A. BYRNE.